Oct. 26, 1954 — R. K. ILER — 2,692,863
PROCESS OF PREPARING A SILICA ORGANOSOL AND RESULTING PRODUCT
Filed Nov. 23, 1951
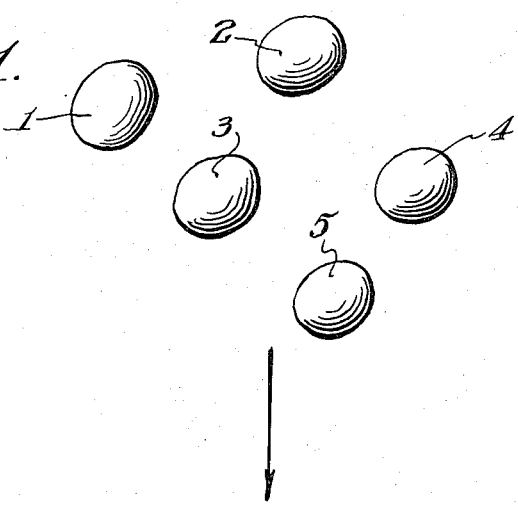
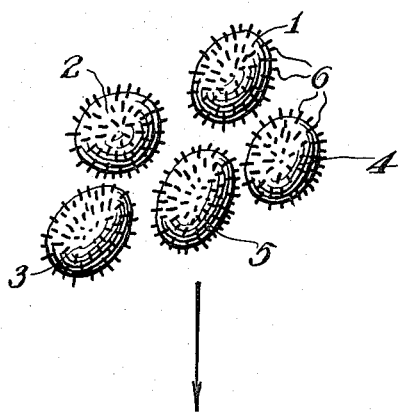
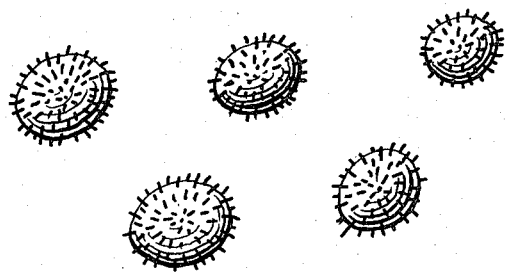
INVENTOR.
RALPH K. ILER
BY
ATTORNEYS Patented Oct. 26, 1954

2,692,863

UNITED STATES PATENT OFFICE 2,692,863

PROCESS OF PREPARING A SILICA ORGANO-SOL AND RESULTING PRODUCT

Ralph K. Iler, Wilmington, Del., assignor to E. I. du Pont de Nemours and Company, Wilmington, Del., a corporation of Delaware Application November 23, 1951, Serial No. 257,834

2 Claims. (Cl. 252—309)

This invention relates to organosols containing, as a dispersion in a brine-immiscible organic liquid, colloidal particles of amorphous silica having an average diameter of 10 to 150 millimicrons, the particles being made organophilic by long-hydrocarbon-chain-substituted ammonium base upon the surfaces of the particles. The invention is further directed to processes for preparing such organosols.

Organosols of silica made according to the invention are composed of silica particles which are highly organophilic. The sols thus prepared are more compatible in organic systems than those in which the particles are less organophilic.

In the drawing, Figure 1 illustrates the ultimate silica particles in an aquasol; and Figure 2 shows the condition of silica particles after they have been treated according to the first step of the present invention and while they are still essentially in an aqueous medium; and Figure 3 shows an organosol of the invention.

Considering processes and products of the invention broadly and referring to the drawing there is illustrated in Figure 1 a silica sol in water. The silica particles 1, 2, 3, 4, and 5 are shown for convenience as substantially spherical. Indeed, as will be pointed out hereinafter, the particles in preferred sols for use according to the invention are substantially spherical, dense, discrete, and relatively uniform. The surface of these particles 1, 2, 3, 4, and 5 is hydrophilic, presumably because of the surfaces being covered with hydroxyl groups.

In Figure 1 the particles are represented as spaced apart and in a dispersed and non-aggregated condition.

According to processes of the present invention a long-hydrocarbon-chain-substituted ammonium base, such as cetyl trimethyl ammonium bromide, is added to the aquasol illustrated in Figure 1. As shown in Figure 2, the particles 1, 2, 3, 4, and 5 receive a coating of the base represented at 6 by short lines. These lines represent the long-chain molecule of the base.

Simultaneously with the addition of the base, or thereafter, a brine-immiscible organic liquid is added to the aquasol. As shown in Figure 3, the organophilic particles are dispersed in the organic liquid. The water phase is not illustrated in the figure.

The preferred aqueous sols for use according to the invention are those having particle sizes ranging from about 10 to 150 millimicrons in diameter and being composed of dense particles. A silica sol prepared by ion-exchange as in the Bird U. S. Patent 2,244,325 is composed of silica particles well below 10 millimicrons in diameter. Such a sol is not well suited to use in processes of the present invention without further treatment.

Silica sols of dense particles, which it is preferred to use, may be made by heating a silica sol prepared by ion-exchange as described by Bird U. S. Patent 2,244,325 to a temperature above 60° C. and adding further quantities of the same type of sol until at least five times as much silica has been added to the original quantity as was at first present. The particles in sols thus produced are in excess of 10 millimicrons in average diameter and, depending upon the conditions of treatment, range upwardly to, say, about 150 millimicrons. The particles in a particular sol are surprisingly uniform in size. The process is fully set out in the application of Max F. Bechtold and Omar E. Snyder in United States application Serial No. 65,536, filed December 15, 1948, now Patent No. 2,574,902.

The particles of such a sol are quite dense, and this may be shown by drying the particles and then determining the amount of nitrogen adsorption. From the nitrogen adsorption it may be determined that the particles have a surface area not greatly in excess of that computed from the particle size as determined by electron micrographs. It will be evident that if the particles are not dense, but rather are porous, then the apparent surface as determined by nitrogen adsorption will be much higher than that expected from the particle diameters. Nitrogen adsorption, accordingly, affords an easy measure of the density of the particles. Summarizing then, the preferred sols for use as starting materials according to the present invention have particles of such density that the surface area as determined by nitrogen adsorption is not greatly in excess of that computed for the particle size as determined by examination of an electron micrograph. The adsorption should not be more than about 30 per cent greater than that computed from the apparent particle sizes.

The method of determining the surface area by nitrogen adsorption is described in "A New Method for Measuring the Surface Areas of Finely Divided Materials and for Determining the Size of Particles" by P. H. Emmett in "Symposium on New Methods for Particle Size Determination in the Subsieve Range" in the Washington Spring Meeting of A. S. T. M., March 4, 1941.

Sols prepared as above described ordinarily have a silica: alkali ratio of from 60:1 to 130:1.

This refers to the weight ratio of total silica expressed as SiO₂ to total alkali expressed as Na₂O Such sols may be adjusted with regard to pH by suitable additions of acid or removal of alkali.

Instead of the sols as above described which have extremely dense particles and very uniform particle size, one may use instead the non-uniform, non-dense type of product which can be made by precipitation of a silica gel and redispersion with alkali. Such a process is described, for instance, in the White U. S. Patent 2,375,738. The products prepared by redispersion of silica ordinarily have a good deal higher nitrogen adsorption than would be indicated by apparent diameter. This shows considerable porosity. The nitrogen adsorption is about 50 per cent greater than that computed.

Still other silica sols may be used and it will be seen that it is important only that they have a particle size from about 10 to 150 millimicrons and that they be reasonably dense when dried. It is this latter property which sharply distinguishes them from silica gels. It is to be observed that all of the silica sols and silica particles suggested as suitable are amorphous.

A silica sol may advantageously be used which is essentially free from salts. This may be prepared, for instance by dialysis. Silica sols essentially free from salts can also be prepared by removal of cations and anions by the use of suitable ion-exchangers. Sols of this type may be made in quite concentrated form and because of their high purity are especially suitable for some purposes of the present invention. The preparation of such sols is described and claimed in United States application Serial No. 183,902, filed September 8, 1950, by Joseph M. Rule, now Patent No. 2,577,485.

The concentration of the sol may vary widely, though it will generally be desirable to use as concentrated a sol as can be handled without getting permanent precipitation or gelling or excessive precipitation during processes of the invention. Ordinarily, the sols will contain between 2 and 20% by weight of SiO₂. While a precipitate may be temporarily formed in the sol when the organophilizing agent is mixed with the sol, no permanent harm will be done so long as the further process steps effect a redispersion of the particles. However, where such precipitates are formed, it is desirable to conduct the steps in the process rapidly to avoid aging of the colloidal silica in a precipitated or gelled state.

In such instances, also, operation at low temperatures will be advantageous.

In order to make organophilic the particles in a sol such as those above described, there is added to the sol a long-hydrocarbon-chain-substituted ammonium base. The base should be one which forms a water-soluble hydrochloride, that is, the hydrochloride must dissolve to the extent of, say, ½ per cent or more in hot water. It will also be observed that such bases will form a precipitate with silica sols when added to a concentrated silica sol at a pH of about 7.

Basic nitrogen compounds which are effective according to this invention are characterized by forming a precipitate when an aqueous silica sol having a particle size of about 17 millimicrons is tested with the solution of a salt of the nitrogen base as follows: The silica sol is diluted to a concentration of 2% SiO₂ by the addition of water and is titrated with a 0.5% solution of the chloride or hydrochloride salt of the nitrogen base while simultaneously adding sufficient sodium hydroxide to maintain the pH at about 8. A precipitate should result at or before the point at which there is present in the mixture the equivalent of 2 nitrogen atoms for each square millimicron of silica surface as calculated from the particle diameter and assuming a density of 2.2 for amorphous silica.

When reference is made herein to a long-hydrocarbon-chain-substituted ammonium base, it will be understood that these compounds include primary, secondary, and tertiary amines in which at least one of the hydrocarbon groups attached to the nitrogen has at least one carbon atom which is removed from the nitrogen by from 8 to 20 consecutive carbon atoms. It is also to be observed that the nitrogen may be the hetero atom of a heterocyclic ring.

As examples of such amines there may be named: primary amines, such as octyl, decyl, tetradecyl, and octadecyl; secondary amines, such as octylmethyl, octylbutyl, dodecylmethyl, dioctadecyl, octyl benzyl, dodecyl phenyl, and benzyl octadecyl; and tertiary amines such as octyl diethyl, dodecyl dimethyl, octadecyl dimethyl, dioctadecylethyl, dodecyl methyl benzyl, dodecyl methyl cetyl, and octyl-substituted pyridine where the octyl group is attached to a carbon atom of the ring.

Especially preferred are the long-hydrocarbon-chain quaternary ammonium bases. Again, as observed above, it is desired that these be sufficiently soluble that, for example, they will form a soluble hydrochloride as above discussed. Again, as observed above, it is desired that a quaternary ammonium base have at least 1 hydrocarbon group which has at least 1 carbon atom which is removed from the nitrogen by from 8 through 20 consecutive carbon atoms.

A preferred class of quaternary ammonium bases for use according to the invention is shown in the following formula:

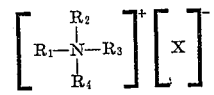

Wherein,

R₁ is a hydrocarbon group, saturated or unsaturated, in which at least 1 carbon atom is removed from the nitrogen by 8 through 20 consecutive carbon atoms;

R₂, R₃, and R₄ are hydrocarbon groups containing less than 20 carbon atoms each;

R₁, R₂, R₃, and R₄ have a total number of carbon atoms which is no greater than 40; and X is a cation, such as chloride or hydroxyl.

It is to be noted that in accordance with customary practice the various ammonium bases above described are called "bases" whether they are added in form of the hydroxide or in the form of one of the salts such as the chloride or hydrochloride. In any event, these are all capable of forming a true ammonium base.

Typical of the quaternary ammonium bases are: dodecyl pyridium chloride, benzyl dimethyl octadecyl ammonium chloride, cetyl dimethyl orthochloro benzyl ammonium bromide, dodecyl N-ethyl morpholinium chloride, and compounds represented by the formulae:

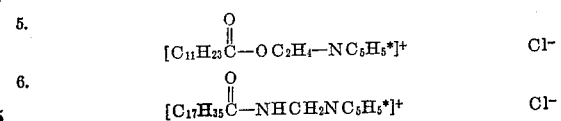

7.

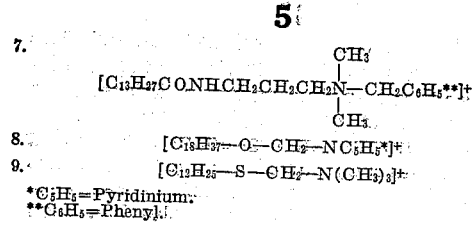

[C₁₃H₂₇CONHCH₂CH₂CH₂N(CH₃)₂—CH₂C₆H₅**]⁺    Cl⁻

8.    [C₁₈H₃₇—O—CH₂—NC₅H₅*]⁺    Cl⁻
9.    [C₁₂H₂₅—S—CH₂—N(CH₃)₃]⁺    Cl⁻

*C₅H₅=Pyridinium.
**C₆H₅=Phenyl.

The amount of the ammonium base to use can most easily be determined in a particular instance by titrating the base into the sol and observing completion of the transfer of silica to an organic phase. It will be noted of this quantity that it will be the minimum amount which is effective and will not represent a complete coverage of the particles in all cases. In many instances the groups will be attached at separated intervals leaving a number of hydroxyl groups upon the surfaces. In such sols the transfer to polar solvents, such as ketones and alcohols and amides, proceeds satisfactorily. For transfer to hydrocarbon solvents a much more complete coverage is desired.

A large excess of the base is generally to be avoided because it tends to cause emulsification of the organic liquid with the aqueous phase. Generally, it is desirable to add no more of the base than will provide a mono layer or a little less upon the silica surface. For most types of organic bases an amount calculated to give about 1 nitrogen atom in the form of the base for every 25 square angstroms of silica surface will provide a suitably complete coverage. The exact amount will depend somewhat upon the structure of the base. In general, about 5% of the surface of the silica should be covered. Thus, at least sufficient of the ammonium base should be used to provide the equivalent of 1 basic nitrogen atom for every 500 square angstroms of silica surface. Typical quantities of benzyl dimethyl octadecyl ammonium chloride, for example, to be used with a silica sol made up of 10 millimicron particles will thus range from about 4 to 83 grams of the nitrogen base chloride per 100 grams of SiO₂ in the system. On the other hand, for a silica sol containing particles of 130 millimicrons diameter the weight of base ranges from a minimum of 0.3 gram to about 6.4 grams per 100 grams of SiO₂.

Organic liquids which form the organosols of the present invention are preferably those which will form a second liquid phase when added to a saturated solution of sodium chloride at 25° C. with good mixing. This is of course what is meant when reference is made to a liquid as being immiscible with brine.

Suitable organic liquids are such organic solvents as the monohydric alcohols, such as normal propanol, normal butanol, isopropanol, isobutanol, tertiary butyl alcohol, and methyl isobutyl carbinol. The alcohols can be substituted, as, for example, such materials as H(CF₂)₆CH₂OH. Ethers and substituted ethers are suitable solvents. For example, there can be used diethyl ether, dichloroethyl ether, propylene oxide, and so forth. Other suitable solvents comprise ketones—for example, acetone, methyl isopropyl ketone, and methyl ketone; esters, such as butyl acetate; amides and substituted amides, such as dimethyl formamide; and ethers of phosphorus oxyacids, such as tributyl phosphate, triisoamyl phosphate, and triethyl phosphate.

Present also in the solvent system may be hydrocarbons. Other organic solvents which may be used thus include benzene, toluene, normal hexane, cyclohexane, chlorinated hydrocarbons such as carbon tetrachloride, chloroform, and tetrachloroethylene. It is to be noted of the hydrocarbons and other such non-polar liquids which do not contain oxygen or nitrogen atoms that it will often be found very advantageous to include at least small amounts of one of the polar solvents of the types previously discussed.

The organic liquid can of course be present in amounts ranging from just sufficient to provide a dispersion medium for the silica to relatively large quantities where a dilute organosol is desired. It is further to be noted that mixtures of these organic liquids may be used as described and that water need not be separated entirely from the organic liquid. A large amount of organic liquid may be used to effect the extraction of the silica, and thereafter, if desired, the organic liquid may be in part removed by distillation. Again, transfer may be effected to still other organic liquids. A preferred method is to use a mixture of a readily volatile polar liquid mixed with a minor quantity of a higher boiling organic liquid during the extraction step, thereafter removing the more volatile component, and thus obtaining a concentrated sol in the less volatile component.

In conducting processes of the invention it is preferred that the pH be near neutrality at the time when the silica is transferred to the organic liquid. This is particularly important in the case of weak organic bases. As for the quaternary ammonium-type of organic bases, the pH is much less critical and may vary within the range, say, from 2 to 10 although it is still preferred to be near neutral.

In conducting processes of the invention the brine-immiscible organic solvent will ordinarily be added to the aquasol even before addition of the base is begun. During addition of the base, the two phases will be violently agitated and transfer of the silica will occur continuously.

Alternatively, the organic base may be added in such amount as to precipitate all of the silica in the system in a form which can be filtered off, washed, and then dissolved in the organic solvent.

When the silica has been transferred to the organic phase, or even before the transfer has been completed, it is often advantageous to add salt to the sol. Sodium chloride, sodium nitrate, sodium sulfate, or other highly soluble, neutral salts can similarly be used up to the point of saturation. These assist the separation of the silica from the water and the transfer into the organic liquid. They simultaneously reduce the solubility of water in the organic phase, thus effecting a cleaner separation. Furthermore, it is often noted that the higher density of the saturated salt solution permits more ready separation of the two phases by gravity or centrifuging.

The organosols, and by this it is meant to include sols containing some water, are suitable for a wide variety of uses. Organosols containing comparatively little water can readily be introduced into a wide variety of organic media. They may be mixed with liquid or dry lubricants, such as hydrocarbon oils, fluorocarbon oils, silicone oils, vegetable oils, polyether oils, graphite, talc, molybdenum sulphide, powdered mica to give improved viscosity, wetting power, body, water resistance, and the like in many of the ordinary uses of these materials. Greases result when somewhat larger quantities of the organosol are incorporated in these oils. Hydraulic fluids can also be thickened.

The organosols can be used as a means of introducing colloidal silica as a clarifying agent and adsorbent for purification of petroleum products. It is particularly effective, since it readily disperses in the organic medium to be treated, and yet can readily be caused to agglomerate and settle out with the impurities at the end of the process. This organosol also promotes dispersion of other types of decolorants such as clays. Vapors may also be effectively scrubbed by bubbling them through the organosols.

Fuels, particularly diesel fuels and rocket fuels, can be improved by having silica dispersed therein by means of these organosols because it provides a catalytic surface for combustion and also keeps the combustion chamber clean.

Waxes, especially those used in coating paper, are greatly improved by addition of these silica organosols. They have more body when hot, permitting thicker coatings by a single dip, and preventing blocking during hot weather. Wax compositions containing organic solvents such as paste waxes and waxes dissolved or suspended in naphthas can advantageously be modified with organosols as herein described.

Pesticides and insecticides, particularly those in organic solvents, are greatly improved by incorporation of dispersed organophilic silica in the organosol. The silica may act as a diluent, extender, carrier, activator, dispersing agent, wetting or emulsifying agent, and thickener. The latter use is particularly applicable to the preparation of pastes and salves used on farm animals.

The organosols form a vehicle by which the colloidal silica can be dispersed into molded plastics to act as a filler to improve tensile and compression and shear strength. Even transparent or translucent plastics which have an index of refraction near that of colloidal silica will retain their transparency when filled. The colloidal silica also serves to diminish the tackiness of the surfaces of plastics after molding, or of films after extrusion.

In rubber and other linear organic polymers, the hydrophobed silica in an organosol can be dispersed directly in the latex or in monomer or low polymer solutions before polymerization. The surface coating on the colloidal silica prevents it from adsorbing catalysts, activators, and the like, and thus does not interfere with the final polymerization or curing. The colloidal silica can also be incorporated into the finished polymer before it is spun into fibers or extruded into sheets. Tensile, tear strength, tenacity, temperature resistance, and resistance to deformation are greatly improved in these cases.

These organosols act as dispersing agents, and often modify the polymerization when incorporated into dispersions and emulsions of monomers before polymerization.

The silica dispersed in organic polymers acts as a delusterant, anti-slipping agent, and stiffening agent, and improves the penetration, retention, and color of the dyes used.

Synthetic rubbers, such as neoprene and GRS, are, of course, included in this summary.

These organosols can be combined with organic polymer-type protective coatings, including resins, lacquers, drying oils, etc., to improve adhesion and to strengthen and harden the protective film. They are also effective in the oleoresinous paints and in the chemically-resistant polymeric coatings such as "Teflon." The colloidal silica acts as a flatting agent, a dispersing and suspending agent, a thickener, a wetting agent, an extender, and the like.

The silica having an organophilized coating can be dried directly out of the aqua organosols to form a solid dry product. Where at least 50% of the surface of the silica particles has been covered with organophilic groups, these dry products can be dispersed directly into organic solvents, or into organic resins, or can be incorporated into organic solvent dispersions of other materials. While for some uses it is desirable to maintain the products in a wet condition, nevertheless there are cases in which it is desirable to dry the products and then incorporate the dry products in the composition to which it is to be added. The dry products can be directly dispersed in the various compositions above discussed with reference to organosols.

In order that the invention may be better understood, the following specific examples are given in addition to those already generally described:

Example 1

A colloidal silica sol containing 20 g. of $SiO_2$ as particles between 10 and 15 millimicrons in diameter and having a pH of about 9 was diluted to 1000 cc. with tap water, and mixed with 100 cc. of benzene. A dodecyl pyridinium chloride solution (120 cc. containing 2.4 grams of dodecyl pyridinium chloride) was then slowly added at 80° C. Precipitation appeared to be complete when about 60 cc. of the dodecyl pyridinium chloride had been added, corresponding to 6% dodecyl pyridinium chloride on the weight of dry $SiO_2$. The mixture was allowed to stand, but no separate benzene layer containing silica appeared; the mixture remained as an emulsion or suspension. The suspension was filtered yielding a relatively porous, moist cake weighing 178 grams, and therefore, containing about 11% $SiO_2$. The filter cake was white and greasy to the touch. The filter cake was immiscible, upon vigorous agitation, with water, but was completely soluble in acetone, yielding a practically clear, stable, colloidal solution. Analysis showed that it contained 6.4 parts of dodecyl pyridinium chloride (or equivalent dodecyl pyridinium groups) per 100 grams of $SiO_2$.

Example 2

A colloidal silica solution containing 30.5% silica by weight and a pH of 9.18 and consisting of particles about 17 millimicrons in diameter was added in a thin stream with vigorous agitation to 10 cc. of 37% HCl. The final pH was 1.75. To 250 grams of this acidic colloidal silica solution were added 315 grams of isopropanol and 30 grams of fine sodium chloride crystals. The resulting system emulsified immediately. Twenty-five cc. of a 40% dodecyl pyridinium chloride solution were added in increments finally causing the emulsion to break and bringing about a complete separation into two layers. The resulting dodecyl pyridinium chloride/$SiO_2$ weight ratio was approximately 13/100. An additional 80 grams of isopropanol was added during the separation. The isopropanol layer (500 grams) contained 12.4% $SiO_2$ and 18.6% $H_2O$.

A portion of this isopropanol layer (365 grams) was placed in a 1-liter, 3-neck, round-bottom flask, heated over an oil bath, and fitted with an air stirrer and a distilling column. The isopropanol-azeotrope was removed by distillation, 633 grams of dry isopropanol being added to the distilling flask intermittently to maintain the volume. The product sol (128 g.) remaining in the distilling flask at the end of the run contained 27.9% $SiO_2$ and 0.60% $H_2O$. Upon cooling, the sol was viscous and opaque, but after dilution with isopropanol the viscosity and turbidity were low. The solution was compatible with benzene.

*Example 3*

A silica solution containing 25.4% $SiO_2$ and having a particle diameter between 15 and 20 millimicrons was added with vigorous stirring to 10 cc. of 37% HCl in 10 cc. of water until the pH reached 1.7. A total of 400 grams of the acidified sol was treated with 400 grams of isopropanol, 40 grams of sodium chloride, and 12 grams of a solution containing 4.8 grams of dodecyl pyridinium chloride exactly as described in Example 2. The system separated into two layers, the upper isopropanol layer weighing 748 grams and containing 11.4% $SiO_2$ and 29.9% $H_2O$. The lower brine layer was discarded. A 640 g. portion of the isopropanol layer was mixed with 600 grams of benzene and 50 grams of a solution containing 24.8 grams of dodecyl pyridinium chloride. The mixture again separated into two layers.

The upper benzene-isopropyl alcohol layer weighing 1064 grams and containing 8.34% silica and 5.15% water was removed in a separatory funnel and distilled as described in Example 2, using a Berl saddle packed column (30") attached to a 3-neck, round-bottom flask containing an air driven stirrer and heated by an oil bath. The distillation was carried out over a temperature range of 65.8 to 71.0° C. to remove the benzene-isopropanol-water azeotrope which boils at 66.51° C. A 1:1 reflux ratio was employed with additions of benzene being made periodically to maintain the volume. A total of 236 grams of benzene was added to 843 grams of the mixture in the still. The product (527 grams) remaining in the distilling flask contained 13.4% $SiO_2$, 0.12% $H_2O$, benzene, and a considerable fraction of isopropanol. The product was a clear, non-viscous, light-straw colored liquid. It did not gel after many months at room temperature.

In order to prepare an alcohol-free sol, distillation of this product was continued to remove isopropanol and benzene as a binary azeotrope which boils at 71.92°. Thus, 296 grams of this product were distilled over the range of 71 to 79.5° C. with the periodic addition of a total of 294 grams of benzene. The benzene sol (317 g.) remaining in the distilling flask contained 12.4% $SiO_2$ and 0.02% $H_2O$. This product was only slightly more turbid than that containing some residual isopropanol. It was equally non-viscous.

*Example 4*

A colloidal silica solution containing 30.85% silica and having a particle diameter of about 18 millimicrons was added in a fine stream, with agitation, to 5 cc. of 37% HCl. The final pH was 1.85. To this solution were added 334 grams of a tertiary butyl alcohol-water azeotrope, 100 grams of tertiary butyl alcohol, 30 grams of sodium chloride crystals, and a total of 41 cc. of a 40% dodecyl pyridinium chloride solution, which was sufficient to break the emulsion and to effect a good separation into two layers. The upper organic layer (649 grams) contained 15.4% $SiO_2$, 17.8% $H_2O$, and 16 grams of dodecyl pyridinium chloride per 100 grams of $SiO_2$. A sample of 515 grams of this tertiary butyl alcohol extract was mixed with 515 grams of toluene and 55 cc. of a 40% dodecyl pyridinium chloride solution was added by increments until separation into two layers again occurred. The toluene-tertiary butyl alcohol layer contained 7.8% $SiO_2$ and 6.3% $H_2O$, and 0.1% nitrogen, or about 33 grams of dodecyl pyridinium chloride per 100 grams of silica.

The azeotropic dehydration and alcohol recovery were carried out in a set-up similar to that employed in preparing the benzene sol described in Example 2. Thus, 728 grams of the toluene-tertiary butyl alcohol extract was distilled over a range of 76 to 108.8° C., while 173 grams of toluene were added during the course of the distillation to maintain the volume of the liquid. The stable toluene sol remaining in the distilling flask was clear and of low viscosity, and contained 14.1% $SiO_2$ and less than 0.06% $H_2O$. It was compatible with equal volumes of carbon tetrachloride, dichloroethyl ether, petroleum ether, kerosene, turpentine, ethyl ether, ethyl alcohol, normal hexanol, heptanol-2 and tetralin.

*Example 5*

A colloidal silica sol containing about 30% $SiO_2$ and consisting of particles of about 17 millimicrons in diameter was charged into a 12-liter, three-neck flask to which was attached a 2' x 6" glass column packed with ⅛" helices. A total of 2 kg. of a colloidal silica sol (prepared according to U. S. patent application Ser. No. 65,635) containing about 30% $SiO_2$ was deionized by passing through a bed of anionic ion-exchange resin, and then through a bed of cationic ion-exchange resin. Two kg. of the deionized sol was diluted with 6 kg. of normal propanol and the mixture was added to the hot normal butanol at a continuous regular rate for a period of 8 hours. The column was operated at the maximum boil-up rate allowable without flooding, and a reflux ratio of approximately 2.2 was used throughout the addition and dehydration steps. The latter required about 3 hours. The end of the dehydration step was signalled by the rise in the head temperature to the boiling point of normal butanol.

The dilute organosol was treated with 4% by weight of dimethyl octadecyl benzyl ammonium chloride. A three-necked, 1-liter flask (equipped with a mechanical stirrer, a dropping funnel, a thermometer, and distillation head) was half-filled with the dilute organosol. While the sol was being stirred, the pressure was reduced to approximately 35 ml. and the contents of the flask were then heated by means of a water bath held at 65–70° C. Distillation was carried out at constant volume by adding organosol at the same rate that the alcohol was distilled from the pot until the desired $SiO_2$ concentration was reached. The resulting sol had a high degree of stability, e. g., more than 200 hours at 100° C. and indefinitely at room temperature. It was completely compatible with benzene.

I claim:

1. An organosol of colloidal particles of amorphous silica having an average diameter of 10 to 150 millimicrons, the particles having adsorbed upon their surfaces a long hydrocarbon-chain-substituted ammonium ion of which the hydrochloride is water-soluble, said ammonium ion having the formula $$\left[ \begin{array}{c} R_2 \\ R_1-N-R_3 \\ R_4 \end{array} \right]^+$$

wherein $R_1$, $R_2$, $R_3$, and $R_4$ are hydrocarbon groups containing a total of no more than 40 carbon atoms, the $R_1$ group has at least one carbon atom removed from the nitrogen by from 8 to 20 consecutive carbon atoms, and $R_2$, $R_3$, and $R_4$ contain less than 20 carbon atoms each.

2. In a process for preparing a silica organosol from an aquasol of colloidal particles of amorphous silica having an average diameter of from 10 to 150 millimicrons, the steps comprising adding an organic liquid from the group consisting of alcohols, ethers, ketones, esters and amides and a long-hydrocarbon-chain-substituted quaternary ammonium base, the ammonium ion of the base having the formula $$\left[ \begin{array}{c} R_2 \\ R_1-N-R_3 \\ R_4 \end{array} \right]^+$$

wherein $R_1$, $R_2$, $R_3$, and $R_4$ are hydrocarbon groups containing a total of no more than 40 carbon atoms, the $R_1$ group has at least one carbon atom removed from the nitrogen by from 8 to 20 consecutive carbon atoms, and $R_2$, $R_3$, and $R_4$ contain less than 20 carbon atoms each, transferring the silica coated with the quaternary ammonium base to the organic liquid, and separating the liquid from water.

References Cited in the file of this patent

UNITED STATES PATENTS

| Number | Name | Date |
|---|---|---|
| 2,515,949 | Di Mais | July 18, 1950 |
| 2,515,961 | Marshall | July 18, 1950 |
| 2,601,352 | Wolter | June 24, 1952 |